Patented Aug. 31, 1948

2,448,125

UNITED STATES PATENT OFFICE 2,448,125

AMIDE DERIVATIVES AND PROCESS OF MAKING SAME

Richard Sallmann, Gelterkinden, and Charles Graenacher, Riehen, Switzerland, assignors to Ciba Limited, a Swiss firm No Drawing. Application February 4, 1944, Serial No. 521,146. In Switzerland March 26, 1943

16 Claims. (Cl. 260—404.5)

The present invention relates to the manufacture of new amide derivatives by reacting amides containing at least one hydrogen atom attached to at least one amide nitrogen atom, particularly such amides which contain at least three carbon atoms, formaldehyde and salts of ammonia or salts of primary amines with one another, if desired in the presence of an acid.

It is particularly advantageous to react the amide, for example a primary amide, with the formaldehyde to form at first a N-methylol compound, and then allowing this compound to react in a second stage with an ammonium salt or a salt of a primary amine, if desired with addition of an acid. These N-methylol compounds of the amides are either known or can be easily prepared according to analogous processes by treating the amides dissolved in solvents, for instance water, alcohol, acetone, glacial acetic acid, benzene, pyridine and mixtures thereof, with formaldehyde, preferably at a moderately raised temperature and, if necessary, in the presence of condensing agents such as potash, trimethylamine or hydrogen chloride.

The reaction of the amides with formaldehyde and the ammonium or amine salts is performed preferably in the heat and in the presence of solvents, such as methanol, ethanol, acetone—if necessary with addition of acids, such as acetic acid, formic acid or hydrogen chloride. It is particularly advantageous to carry out the reaction in concentrated, water-soluble organic acids, such as glacial acetic acid, for example at 70–100° C. The procedure may also be similar when applying the modification of the present process referred to in the opening paragraphs of the specification—reacting the amide with formaldehyde to form the methylol compound and allowing this compound to act on the ammonium or amine salt. It is appropriate to use more than 1 mol. of formaldehyde for each amide group, for example 3 mols.

The formaldehyde to be used in the present process is applied preferably in the form of its polymeric modifications for example in the form of para-formaldehyde.

The amides which are used in this process may be derived from carboxylic acids as well as from sulfonic acids, further from ammonia and its basic mono-substitution products. They may represent, for example, carboxylic acid amides (primary amides or amides mono-substituted in the amide group), urethanes, ureas, hydrazides, further sulfamides.

As starting materials there may be used, for example, amides which are derived from aliphatic, aromatic, aliphatic-aromatic, cycloaliphatic and heterocyclic carboxylic acids. Among these are named: formic acid, acetic acid, propionic acid, acrylic acid, butyric acid, caprylic acid, lauric acid, coco nut fatty acid, palmitic acid, stearic acid, oleic acid, linoleic acid, hardened whale oil fatty acid, adipinic acid, further benzoic acid, naphthoic acid, para-stearoylaminobenzoic acid, hexahydrobenzoic acid, tetrahydronaphthyl acetic acid, resin acids or naphthenic acids, such as abietic acid, further chloroacetic acid, chloromethylbenzoic acid, chloropropionic acid, glycollic acid. As starting materials there are also suitable the N-substitution products resulting from the amides of the foregoing compilation which still contain at least one hydrogen atom linked to the nitrogen atom, such as N-methyl-, ethyl-, hydroxyethyl-, dihydroxypropyl-lauric acid amide. Products possessing particularly valuable properties are obtained when using as starting materials primary amides of fatty acids with at least 12 carbon atoms. If the acids from which the amides to be used as starting materials are derived do not already contain 3 carbon atoms, it is advantageous to start from such N-monosubstitution products of these amides which contain at least 3 carbon atoms. As starting materials there may further be mentioned cyclic amides, such as phthalimide and diketopiperazine. As amides of the urea group there may be mentioned, for example, monoethyl-, monophenyl-, monododecyl-, monooctadecyl-, N:N'-didodecyl urea; as amides of the urethane group for example octadecylurethane, further diurethanes, such as methylene-dioctadecylurethane. As amides of the hydrazide group there may be used for example the hydrazides corresponding to the above indicated amides, such as lauric acid hydrazide. As amides of the sulfamide group there may be named for example aromatic sulfamides, further the amides obtained from paraffin hydrocarbons by treating with chlorine and sulfur dioxide and irradiation with short wave light and subsequent action of ammonia or of primary amines.

By the expression salts of ammonia compounds in which at least one N-atom, besides being linked with hydrogen atoms, is linked with not more than one substituent, there are to be understood salts of ammonia and salts of primary amines. As is known, primary amines are ammonia compounds in which one hydrogen atom is replaced by a hydrocarbon radical which may also be substituted; in ammonia, however, the N-atom is linked with 3 hydrogen atoms. Ammonia and primary amines have common properties: they possess both the basic atom grouping NH2— and form salts with acids, both with inorganic and organic acids.

As ammonium salts, that is salts of ammonia, there may be used ammonium salts of organic or inorganic acids, such as ammonium acetate, ammonium formate or ammonium chloride.

Among the salts of the primary amines there are named the following: salts, e. g. acetates or formates of aliphatic mono- or polyvalent amines, the carbon chain of which may also contain substituents such as hydroxy-groups, for example, salts of methyl- or ethylamine, further salts of butyl- or amylamines, salts of ethylenediamine, of diethylaminoethylamine or of polyalkylenepolyamines, e. g. of polyethylenepolyamines, moreover salts of hydroxyalkylamines e.g. salts of monoethanolamine, of hydroxypropyl- or hydroxybutylamines, of polyalkylenepolyamines containing hydroxyalkyl groups; salts of mono- or polyvalent aromatic amines, such as aniline, paradimethylaminoaniline, ortho-, meta- or para-phenylenediamine; salts of cycloaliphatic mono- or polyvalent amines, such as cyclohexylamine, hexahydroortho-phenylenediamine. In case salts of diprimary diamines are used, 1 or 2 mols. of amide may be used for 1 mol. of diprimary diamine.

The constitution of the products obtained by the present process could not be ascertained and formulas for these products cannot, therefore, be supplied. However, there is no doubt that the products of the invention contain the atomic grouping for instance,

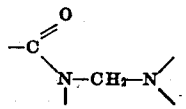

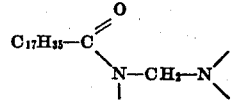

or

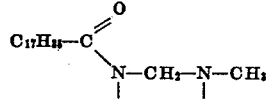

or

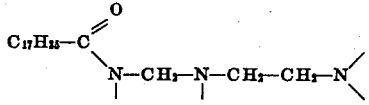

Nevertheless, the products can be fully characterized only by reference to their manufacturing processes. They may be designated as products obtained by the process which comprises condensing amides containing at least 3 carbon atoms and at least one hydrogen atom united to an amide nitrogen atom with formaldehyde and with salts of ammonia compounds in which at least one nitrogen atom, besides being linked with hydrogen atoms, is connected with at most one substituent, which products, in the form of their salts with low molecular aliphatic carboxylic acids are liquid to solid substances which are soluble in water and are split up by prolonged boiling with hydrochloric acid.

The products of the present invention are soluble in water in the form of their salts with acids, and may find application as textile assistants. Particularly valuable are those products which contain an aliphatic or cycloaliphatic radical with at least 12 carbon atoms; they may be used, for example, as softening agents, further as wetting, foaming, dispersing or levelling agents, as agents for preventing the agglomeration of the cellulose wool fibrils in the manufacturing process, as agents imparting water-repellent properties to fibers, or as agents enhancing the fastness of dyeings to water. The products of this invention may be used alone or together with other agents generally applied as textile assistants.

The following examples illustrate the invention, but are not to be regarded as limiting it in any way, the parts being by weight:

*Example 1*

7 parts of ammonium acetate and 14.1 parts of stearic acid amide are dissolved in 10 parts of glacial acetic acid at 70–80° C., whereupon 5 parts of para-formaldehyde are added to this reaction mixture, while thoroughly stirring, the temperature of the reaction mass rising to 95° C. with generation of heat. As soon as the temperature begins to drop, the solution is maintained at a temperature of 90–100° C. by external heat supply, whereupon the reaction is complete after 10–15 minutes, a sample of the reaction solution, mixed with little formic acid, being clearly soluble in water without precipitating the starting material any longer. After distilling the glacial acetic acid in a vacuum, the residue is stirred with water and simultaneously rendered alkaline with caustic soda solution. The base which is completely insoluble in water is filtered off, washed and dried. The new base is obtained as a colorless, solid fatty mass which is easily soluble in organic solvents. The formate which is soluble in water but decomposes on prolonged boiling is obtained by dissolving the base in formic acid. The salts of the base are split off even more rapidly with mineral acids in the heat, by precipitating water-insoluble products.

The procedure is similar when using coconut fatty acid amide instead of stearic acid amide.

*Example 2*

15 parts of ammonium acetate are dissolved in 40 parts by volume of glacial acetic acid, whereupon 30 parts of coconut fatty acid methylolamide are added at 80–90° C., while stirring. After the latter is completely dissolved, 10 parts of para-formaldehyde are added to the reaction mixture at 70–80° C. and the reaction mass is maintained at this temperature, while stirring. After about 30 minutes a sample thereof, mixed with little formic acid, is clearly soluble in water. As soon as this state is reached, the glacial acetic acid is distilled off in a vacuum, the residue is thoroughly stirred with dilute caustic soda solution, distilled off, washed with water until the reaction is no longer alkaline, and dried. A solid, fatty mass is obtained which dissolves in dilute acids with formation of strongly foaming solutions, and which is decomposed on boiling, especially with dilute mineral acids, with precipitation of insoluble compounds.

A similar product is obtained by a similar course of the reaction when replacing in this example the coconut fatty acid methylolamide by stearic acid methylolamide as starting material.

*Example 3*

4 parts of a monomethylamine acetate solution in glacial acetic acid containing 25 per cent. of base are diluted with 20 parts by volume of glacial acetic acid, whereupon 8 parts of methylol stearic acid amide are added at 70–80° C. while stirring. After the latter has dissolved to a clear solution, 2 parts of para-formaldehyde are added to the reaction mixture which is then stirred at the indicated temperature until a sample thereof is clearly soluble in dilute acetic acid or formic acid, which is the case after about 90 minutes. The product is worked up as described in Example 1, whereby the new base is obtained as a white powder which is soluble in dilute acids.

The strongly foaming solutions of these acids show cation-active properties and precipitate dyestuffs containing sulfonic groups from their solutions. The product is an excellent softening agent for textile materials.

Instead of monomethylamine acetate there may be used salts of other bases, such as monoethylamine, allylamine, butylamine, the products thus obtained having similar properties.

Instead of stearic acid methylolamide there may also be used oleic acid methylolamide as starting material, whereby a yellowish colored semi-solid base is obtained which has similar properties like the stearic acid derivative obtained according to the above example.

Example 4

9.5 parts of stearic acid methylolamide are introduced in a stream of nitrogen at 50–60° C., while stirring, into a solution of 3.6 parts of freshly distilled ortho-phenylene diamine in 25 parts of glacial acetic acid, and when all has dissolved there are added 4 parts of para-formaldehyde at 70–75° C. The reaction mixture is heated for about 2 hours, while stirring, to 70–80° C., whereupon a sample of the reaction mixture, to which some formic acid has been added, is clearly soluble in water. The glacial acetic acid is distilled off in a vacuum, the residue is stirred with water and dilute caustic soda solution, filtered and washed with water until the reaction is neutral. The new base is obtained as a white fatty powder which is soluble in dilute acids with formation of foaming solutions.

A similar product which is also soluble in water is obtained when working as described in the above example, but starting from 2.16 parts of ortho-phenylene diamine and condensing with 12.4 parts of methylol stearic acid amide.

Example 5

12.6 parts of methylol stearic acid amide and 6 parts of para-formaldehyde are added to a solution of 1.4 parts of anhydrous ethylenediamine in 30 parts by volume of glacial acetic acid, as indicated in the preceding example. After the reaction has lasted for about 2 hours at 80° C., a sample of the reaction mixture is clearly soluble in dilute acetic acid. The product is worked up as described in Example 4, whereby a fatty, solid mass is obtained which is soluble in dilute acids, the solutions of which being capillary active and possessing excellent softening properties for rayon.

Example 6

3 parts of monoethanolamine are dissolved in 20 parts by volume of glacial acetic acid, whereupon 10 parts of stearic acid methylolamide are introduced at 70–75° C. When the latter has completely dissolved there are added 5 parts of para-formaldehyde and the reaction mixture is maintained at 70–75° C. while stirring, until a sample of the same is soluble in water. After distilling off the glacial acetic acid in a vacuum, the residue is taken up in water, the solution is rendered feebly alkaline with caustic soda solution and the product is precipitated with common salt, filtered and dried. There results a yellowish colored powder which is easily soluble in dilute acids, the solutions of which possessing pronounced softening properties.

Example 7

6 parts of cyclohexylamine and 20 parts by volume of glacial acetic acid are reacted, as described in Example 3, with 6 parts of stearic acid methylolamide and 3 parts of para-formaldehyde, whereby a new base soluble in dilute acids is obtained, as in Example 3.

Example 8

A new condensation product is obtained according to the process described in Example 3 by using the following components:

5.4 parts of para-aminodimethylaniline dissolved in 25 parts by volume of glacial acetic acid are mixed with 9.4 parts of stearic acid methylolamide and 2 parts of para-formaldehyde. After heating for 2 hours the reaction mixture is worked up in the usual manner, whereby a yellow colored base is obtained which is easily dissolved in dilute acids.

Example 9

5.5 parts of coconut fatty acid hydrazide and 4 parts of para-formaldehyde are added at 60–70° C. to a solution of 1 part of monomethylamine in 23 parts by volume of glacial acetic acid. The reaction mixture is heated to 75–80° C., while stirring, whereupon a sample of the reaction mixture is soluble in dilute formic acid after 20–30 minutes. After working up as in the preceding examples there is obtained a feebly yellow powder the solutions of which foam strongly in dilute acetic acid and are rapidly decomposed after addition of mineral acid, especially on heating, with precipitation of insoluble products.

Example 10

9.8 parts of 4-nitro-methylolbenzamide and then 3 parts of para-formaldehyde are added at 70–80° C. to a solution of 1.7 parts of monomethylamine in 25 parts by volume of acetic acid. The reaction mixture is kept for about ½ hour at the indicated temperature, whereupon a sample of the same is clearly soluble in acidified water. After distilling off the acetic acid in a vacuum, there remains a yellowish colored, honey-like, viscous mass. The aqueous solutions of which are fairly rapidly decomposed on heating with mineral acids, while splitting off sparingly soluble products.

Example 11

8 parts of stearic acid monomethylamide are introduced at 80–90° C., while stirring, into a solution of 1 part of monomethylamine in 3 parts by volume of glacial acetic acid, and when all has dissolved, there are added 4 parts of para-formaldehyde. After the reaction has lasted for ½ hour at the above temperature, a sample is nearly clearly soluble in water. The reaction mass is worked up as described in Example 3. The properties of the product correspond to those of the product obtained according to Example 3.

Example 12

Rayon can be softened in the following manner: Viscose rayon yarn is handled for ½ hour in an aqueous solution containing per liter 0.03 gram of the product described in Example 1, the ratio of goods to liquor being 1:30. The material is then centrifuged and dried. The rayon treated in such a manner has an extraordinarily soft, flowing feel.

What we claim is:

1. A process for the manufacture of an amide derivative, which comprises condensing 1 mol of an amide containing at least 12 carbon atoms and at least one hydrogen atom united to an amide nitrogen atom with at least 2 mols of formaldehyde and with 1 mol of a member selected from the group consisting of salts of ammonia and salts of primary amines at a temperature of at least 70° C. and in a solvent medium.

2. A process for the manufacture of an amide derivative, which comprises condensing 1 mol of an amide containing at least 12 carbon atoms and at least one hydrogen atom united to an amide nitrogen atom with at least 2 mols of formaldehyde and with 1 mol of a salt of ammonia at a temperature of at least 70° C. and in a solvent medium.

3. A process for the manufacture of an amide derivative, which comprises condensing 1 mol of a primary amide of a fatty acid containing at least 12 carbon atoms with at least 2 mols of formaldehyde and with 1 mol of a salt of ammonia at a temperature of at least 70° C. and in a solvent medium.

4. A process for the manufacture of an amide derivative, which comprises condensing 1 mol of stearic acid amide with at least 2 mols of formaldehyde and with 1 mol of ammonium acetate at a temperature of at least 70° C. and in presence of an acid.

5. A process for the manufacture of an amide derivative, which comprises condensing 1 mol of an amide containing at least 12 carbon atoms and at least one hydrogen atom united to an amide nitrogen atom with at least 2 mols of formaldehyde and with 1 mol of a salt of a primary amine containing at least one primary amino group at a temperature of at least 70° C. and in a solvent medium.

6. A process for the manufacture of an amide derivative, which comprises condensing 1 mol of an N-methylolamide of a primary amide containing at least 12 carbon atoms and with 1 mol of a salt of a primary amine containing at least one primary amino group at a temperature of at least 70° C. in a solvent medium containing at least 1 mol of formaldehyde.

7. A process for the manufacture of an amide derivative, which comprises condensing 1 mol of an N-methylolamide of a primary amide of a fatty acid containnig at least 12 carbon atoms and with 1 mol of a salt of a primary amine containing at least one primary amino group at a temperature of at least 70° C. in a solvent medium containing at least 1 mol of formaldehyde.

8. A process for the manufacture of an amide derivative, which comprises condensing 1 mol of an N-methylolamide of a primary amide of a fatty acid containing at least 12 carbon atoms and with at least half a mol of a salt of a diprimary amine at a temperature of at least 70° C. in a solvent medium containing at least 1 mol of formaldehyde.

9. A process for the manufacture of an amide derivative, which comprises condensing 1 mol of stearic acid N-methylolamide with 1 mol of methyl amine acetate at a temperature of at least 70° C. in presence of acetic acid and at least 2 mols of formaldehyde.

10. A process for the manufacture of an amide derivative, which comprises condensing 1 mol of stearic acid N-methylolamide with 1 mol of ethylene diamine acetate at a temperature of at least 70° C. in presence of acetic acid and at least 2 mols of formaldehyde.

11. A product obtained by condensing 1 mol of an amide containing at least 12 carbon atoms and at least one hydrogen atom united to an amide nitrogen atom with at least 2 mols of formaldehyde and with 1 mol of a member selected from the group consisting of salts of ammonia and salts of primary amines at a temperature of at least 70° C. and in a solvent medium.

12. The product obtained by condensing 1 mol of stearic acid amide with at least 2 mols of formaldehyde and with 1 mol of ammonium acetate at a temperature of at least 70° C. and in presence of an acid.

13. The product obtained by condensing 1 mol of an amide containing at least 12 carbon atoms and at least one hydrogen atom united to an amide nitrogen atom with at least 2 mols of formaldehyde and with 1 mol of a salt of a primary amine containing at least one primary amino group at a temperature of at least 70° C. and in a solvent medium.

14. The product obtained by condensing 1 mol of an N-methylolamide of a primary amide of a fatty acid containing at least 12 carbon atoms and with at least half a mol of a salt of a diprimary amine at a temperature of at least 70° C. in a solvent medium containing at least 1 mol of formaldehyde.

15. The product obtained by condensing 1 mol of stearic acid N-methylolamide with 1 mol of methyl amine acetate at a temperature of at least 70° C. in presence of acetic acid and at least 2 mols of formaldehyde.

16. The product obtained by condensing 1 mol of stearic acid N-methylolamide with 1 mol of ethylene diamine acetate at a temperature of at least 70° C. in presence of acetic acid and at least 2 mols of formaldehyde.

RICHARD SALLMANN.
CHARLES GRAENACHER.

REFERENCES CITED

The following references are of record in the file of this patent:

UNITED STATES PATENTS

| Number | Name | Date |
|---|---|---|
| 1,952,008 | Bruson | Mar. 20, 1934 |
| 2,075,109 | Friedrich | Mar. 30, 1937 |
| 2,200,452 | Kosslinger | May 14, 1940 |
| 2,278,417 | Baldwin et al. | Apr. 7, 1942 |
| 2,304,156 | Engelmann et al. | Dec. 8, 1942 |

FOREIGN PATENTS

| Number | Country | Date |
|---|---|---|
| 500,110 | Great Britain | Jan. 30, 1939 |